United States Patent [19]

Boles

[11] Patent Number: 4,762,546

[45] Date of Patent: Aug. 9, 1988

[54] PRODUCTION OF HIGH-GRADE NITROGEN-SULFUR SUSPENSION FERTILIZERS

[75] Inventor: Jeffrey L. Boles, Tuscumbia, Ala.

[73] Assignee: Tennessee Valley Authority, Muscle Shoals, Ala.

[21] Appl. No.: 37,492

[22] Filed: Apr. 13, 1987

[51] Int. Cl.$^4$ ............................ C05C 9/00; C05C 3/00
[52] U.S. Cl. ........................................ 71/30; 71/64.08; 423/545
[58] Field of Search ............... 423/545, 551, 520, 166, 423/199, 193; 71/34, 61, 64.07, 64.08, 64.09, 64.13, 28–30

[56] References Cited

U.S. PATENT DOCUMENTS

| | | | |
|---|---|---|---|
| T101,803 | 5/1982 | Jones et al. | 71/64.09 |
| 2,867,523 | 1/1959 | Lutz et al. | 71/61 |
| 3,539,329 | 11/1970 | Wilson | 71/64.13 |
| 3,785,796 | 1/1974 | Mann, Jr. | 71/61 X |
| 3,928,015 | 12/1975 | Siegel et al. | 71/28 |
| 4,066,432 | 1/1978 | Jones | 71/34 |
| 4,579,580 | 4/1986 | Moore | 71/28 |
| 4,589,904 | 5/1986 | Harrison et al. | 71/61 |
| 4,676,821 | 6/1987 | Gullett et al. | 71/28 |

Primary Examiner—Ferris H. Lander
Attorney, Agent, or Firm—Robert A. Petrusek

[57] ABSTRACT

The present invention teaches novel compositions and techniques for economically producing highly concentrated nitrogen-sulfur suspension fertilizers using cheap and readily available by-product ammonium sulfate or by-product sulfuric acid and ammonia in conjunction with solid, liquid, or suspension nitrogen fertilizers and suspending clay. The products of the instant invention exhibit unique and very desirable physical properties and long-term storage characteristics not heretofore encountered in suspensions containing soluble fertilizer salts. Some of these unique characteristics include virtually no crystal growth during exceptionally long storage periods and near-constant or decreasing viscosity with decrease in temperature.

11 Claims, 2 Drawing Sheets

COLD-MIX BATCH PROCESS FOR NITROGEN-SULFUR SUSPENSIONS

PRODUCTION OF HIGH-GRADE NITROGEN-SULFUR SUSPENSION FERTILIZERS

This invention herein described may be manufactured and used by or for the Government for governmental purposes without the payment to me of any royalty thereof.

INTRODUCTION

The present invention relates to new and novel compositions and to new, novel, and relatively simple and inexpensive techniques for easily and accurately producing nitrogen-sulfur suspension fertilizers by combining either ammonium sulfate or sulfuric acid and ammonia with nitrogen liquids, nitrogen suspensions, or nitrogen solids, and suspending clay. More particularly, the present invention relates to novel compositions and techniques for the production of concentrated, high-grade nitrogen-sulfur suspension fertilizers from low cost, impure, raw materials by operation of a simple and economical process which can be either of the batch or continuous-type. Still more particularly, the present invention relates to compositions, means, and methods for the efficient production of high-grade X-0 -0-YS suspension fertilizers containing therein relatively small particles of fertilizer solids and displaying unique and very desirable physical properties as well as long-term storage characteristics.

BACKGROUND OF THE INVENTION

1. Field of the Invention

Heretofore, compositions and processes of the prior art in which nitrogen-sulfur fluids are produced using either ammonium sulfate or a combination of sulfuric acid and ammonia have for the most part been restricted to being solutions of low-grade and low-sulfur content because of the relatively low solubility of ammonium sulfate in various other fertilizer fluids. Other nitrogen-sulfur fluid fertilizers containing ammonium sulfate and produced by the practice of the teachings of the prior art also contain other more soluble fertilizer materials, but these other more soluble materials have the disadvantage that they cause the suspensions to have relatively poor physical and handling properties as well as poor long-term storage characteristics. Fertilizer materials which are highly soluble in water or other fertilizer solutions are considered to be more desirable than materials with low solubility, because higher-grade fluid fertilizers can be produced with the more soluble materials. In producing solution fertilizers, in which no fertilizer solids are to be present, use of more highly soluble fertilizer materials allows for more plant food (higher grade) to be in solution without crystallizing out at a given temperature than when a less soluble material is used. In producing suspension fertilizers, in which small suspended particles of fertilizer solids are present, use of more highly soluble fertilizer materials allows for more plant food to be in solution and less to be present in solid form at a given temperature than when a less soluble material is used. Since the viscosity of suspensions generally increases with increase in the proportion of solids present, and high viscosity is usually the factor limiting the grade of suspensions, higher-grade suspensions can generally be made with more soluble materials because more of the plant food is in solution and less is present in solid form. High viscosity characteristics tend to destroy the fluidity of such suspensions and render the transfer properties thereof, either by gravity or pumping distribution to the soil, rather impractical or indeed, impossible. It will be appreciated by those skilled in the art that suspension fertilizers with such low analysis have a very distinct economic disadvantage as compared with higher analysis products because costs of handling, freight, storage, and application are higher per unit of plant nutrient, all of which are factors of increasingly greater importance as costs associated therewith continue to escalate at a rate faster than certain other considerations, as for example, the costs of production of said fertilizers. It is therefore considered an advantage by those skilled in the art to use fertilizer materials which are highly soluble. However, numerous highly soluble fertilizer materials presently in use, such as urea and ammonium nitrate have the grave disadvantage that, their solubilities are drastically affected by temperature. Thus, when the temperature decreases, the proportion of solid particles present increases rapidly, due to the rapid decrease in solubility, and therefore the suspension viscosity increases rapidly. Therefore, such high grade suspensions which are perfectly fluid at room temperature can completely lose their fluidity at lower temperatures due to high viscosity.

In addition, use of highly soluble fertilizer materials which also have highly temperature-dependent solubilities results in growth of large crystals during storage, especially in situations where ambient temperature fluctuations of rather large magnitude occur. When the temperature rises, a large quantity of the fertilizer solids present go into solution. When the temperature subsequently decreases, thermal lag of the body of liquid and attendant slow cooling of same results in precipitation of a large quantity of fertilizer solids in the form of growth on existing crystals, rather than in the form of nucleation of new crystals, and the result is formation of excessively large crystals. Crystal growth has long been a problem in suspension fertilizers, especially when clear liquid layers of saturated solution form (syneresis) in the suspensions, which is common in nitrogen and nitrogen-sulfur suspensions. When the temperature falls, very large crystals form because the solubility decreases greatly in temperature and no crystals are present in the clear layer portion on which the resulting precipitating solid phase can grow. The result is often growth of the crystal ends at the clear layer interface out into the clear layer, resulting in formation of very large crystals. In the case of urea, growth of crystals in clear layers can result in crystal sizes which approach the dimensions of the storage container. Large crystals are intolerable in suspension fertilizers because they settle to the bottom of storage and shipping tanks, and they clog pumps and fertilizer application equipment.

Another disadvantage in fertilizer materials which are highly soluble and also have highly temperature-dependent solubilities is that diluting these products with water or mixing them with other fertilizer materials often alters the crystallization temperature of the material in such a way that the suspension is rendered unfit for storage due to growth of large crystals when temperature fluctuations repeatedly raise and lower the temperature above and below the crystallization temperature.

2. Description of the Prior Art

At the present time, because of the state of the art developed in view of and in response to said principal consideration supra, there are available a number of methods and means which utilize in one way or another the art of producing nitrogen-sulfur fluid fertilizers using ammonium sulfate and/or sulfuric acid and ammonia, some of which are represented by the investigations, teachings, and disclosures set forth in the following patents: U.S. Pat. No. 4,116,664, Jones, Sept. 26, 1978; Canadian Pat. No. 811,080, Ramaradhya, Apr. 22, 1969; U.S. Def. Pub. No. T101,803, Jones et al., May 4, 1982; U.S. Pat. No. 4,388,101, Lowder, June 14, 1983; U.S. Pat. No. 4,239,522, Wilson et al. Dec. 16, 1980.

Since fluid fertilizers containing sulfur are now needed in many regions of the country for soils which are sulfur deficient, procedures for producing fluid fertilizers containing both nitrogen and sulfur have been developed. One procedure for production of a liquid fertilizer containing both nitrogen and sulfur (as in Jones '664, supra) involves reaction of urea with sulfuric acid to form a liquid nitrogen-sulfate fertilizer comprising urea sulfate and liquefied urea. Sulfuric acid is added gradually to urea, which urea is preferably in powdered or prilled from, and added in controlled amounts to hold the temperature of the resulting reaction within prescribed limits. The sulfuric acid and urea form a resulting reacting molten slurry which is blended slowly during the reaction period. Sulfuric acid is gradually added until the total desired amount thereof has been added, and blending is continued until the slurry becomes completely liquefied. Water is subsequently added to produce desired products which will remain in liquid form at normal ambient temperatures. From the practice of this procedure, a resulting product of grade 31-0-0-9.7S will begin to solidify at a temperature of about 60° F. If this product is diluted with water to a grade of 29-0-0-9S, the then resulting product will begin to solidify at about 10° F. The pH of these products ranges from 0.4 to 1.0. By the practice of still another prior art procedure, a nitrogen-sulfur suspension was produced (as in Ramaradhya 811,080, supra). This procedure involved pregelling clay in urea-ammonium nitrate solution (32% N) and incorporating finely divided elemental sulfur in the solution-clay mixture by mixing in a tank with a propeller-type mixer. The grade of the resulting suspension was approximately 24-0-0-23S, and the stability of the product was adequate for short-term storage.

Still another method for producing a nitrogen-sulfur suspension taught by Jones et al. ('803, supra) involves the reaction of sulfuric acid with gaseous ammonia and the simultaneous addition thereto of a urea-water solution in a single-stage reactor to produce a resulting boiling urea-ammonium sulfate solution. The boiling solutions are then rapidly cooled in two stages to about 100° F. to produce therein an abundance of small urea crystals. The finished product is of grade 29-0-0-5S and contains mostly urea as the solid phase. Because of urea's high solubility and highly temperature-dependent solubility, urea crystals, as is generally well known, are subject to rapid growth to large sizes during storage.

In still another procedure, Lowder ('101 supra) produced nitrogen-sulfur solutions by first mixing sulfuric acid in water, followed by dissolving urea into the resulting acid solution, and finally by adding thereto anhydrous ammonia. However, because the products were solutions, in which the highest grades were limited by solubility, they were low in grade (19 to 25% nitrogen and 3 to 6% sulfur) and had rather high crystallization temperatures (32° to 40° F.) below which the products cannot be stored because the large crystals which form settle to the bottom of storage tanks or plug up solution application equipment.

In yet another procedure taught in the prior art, Wilson et al. ('522, supra) produced nitrogen-sulfur solutions containing urea, ammonium nitrate, and ammonium sulfate. Because these products were solutions, the grades were low relative to suspensions, and, because of ammonium sulfate's low solubility in UAN-32 (a urea-ammonium nitrate solution containing 32% nitrogen), the sulfur contents of these products were relatively low unless the nitrogen content thereof was drastically reduced.

There is no suggestion in the teachings of any of the above mentioned prior art references of the viable process and/or technique as well as the compositions resulting from the practice of the instant invention for the production of nitrogen-sulfur suspensions which (1) are produced with ammonium sulfate and/or a combination of sulfuric acid and ammonia; (2) contain ammonium sulfate solids in appreciable quantities and as the sole source of sulfur therein; (3) have their unexpectedly unique and very desirable physical properties and storage and handling characteristics; and (4) have their unexpectedly high grades and sulfur concentrations.

SUMMARY OF INVENTION

The instant invention relates to novel compositions and techniques, including methods and means, for the production of highly concentrated nitrogen-sulfur suspension fertilizers from nitrogen liquids, suspensions or solids; suspending clay; and ammonium sulfate and/or sulfuric acid and ammonia. The instant invention provides compositions and means and methods for production of highly concentrated nitrogen-sulfur suspensions of widely varying grades and ratios eminently suitable for use in commercially available fluid fertilizer application equipment by being further characterized as having a rheology such that said suspension fertilizers can be sprayed directly onto croplands, as for example those deficient in sulfur, or can be used in combination with other fertilizer materials to produce fluid blend fertilizers for similar application. The gist underlying effecting the concepts of the instant invention involve adjusting the compositions such that the suspensions are not only highly concentrated but also contain only ammonium sulfate as the sole solid phase present. Ammonium sulfate is relatively insoluble in the highly concentrated liquid phase and also has a relatively temperature-independent solubility. Both of these characteristics unexpectedly result in the products having the following unique and very desirable physical properties and storage and handling characteristics:

(1) Virtually no crystal growth during exceptionally long-storage periods (in excess of 2 years).

(2) Virtually no crystal formation and growth in clear liquid layers during exceptionally long-storage periods.

(3) Very little if any viscosity increase and often visosity decrease with decrease in temperature over an exceptionally wide range of temperatures.

(4) Can be diluted or mixed with other fertilizer materials in widely varying proportions without damaging quality.

(5) Virtually unaffected by changes in temperature over an exceptionally wide range.

(6) Product ratio and grade can be varied over a wide range without loss of product quality.

(7) Unusually high concentrations of sulfur can be achieved in the products.

Ordinarily, a relatively insoluble fertilizer solid with a relatively temperature-independent solubility would be considered a disadvantage in production of suspension fertilizers; one normally would expect that these characteristics would drastically limit the grade. Normally, highly soluble materials are sought after for production of suspension fertilizers because higher grades can usually be made since more of the soluble material is in solution and less is present therein in the solid phase. Viscosity of suspensions generally increases with increase in solids content and high viscosity is usually the factor limiting the grade of suspension fertilizers. However, the compositions of the instant invention are such that the solubility characteristics, which would normally be considered disadvantages in a suspension fertilizer, are unexpectedly advantages which impart to the products their unique and very desirable physical properties and improved storage and handling characteristics, supra.

The effecting of the method of the instant invention requires only a minimal amount of relatively inexpensive equipment and is simply and easily placed into practice by setting into motion a first-charging step wherein an agitated mixing vessel is partially filled with the water of formulation and nitrogen liquid(s), suspension(s), or solid(s). While agitating the resulting mixture, suspending clay is added and mixed therein. Subsequent to mixing the clay, ammonium sulfate solids are added to the vessel with agitation and the resulting mixture is agitated or recirculated for specified a period of time to effect gelation of said clay.

A second technique or method of the instant invention also requires only a minimal amount of relatively inexpensive equipment and is simply and easily placed into practice by setting into motion a first-charging step wherein an agitated reactor vessel is partially filled with water of formulation; nitrogen liquid(s), suspension(s), or solid(s); and sulfuric acid. With agitation, ammonia next is added to the mixture in the reactor vessel until the mixture is near-neutral pH (about pH 7). With continued agitation, suspending clay next is added to the hot mixture and the resulting mixture is subsequently cooled quickly to about 100° to 120° F. and sent to storage. Two other techniques of the instant invention consist of continuous-type production versions of the two previously described techniques, supra, for batch production of highly concentrated nitrogen-sulfur suspensions.

OBJECTS OF THE INVENTION

It is therefore the principal object of the present invention to develop new methods and resulting compositions for easily, quickly, and accurately producing highly concentrated nitrogen-sulfur suspensions from common, readily available nitrogen liquids, suspensions, or solids; suspending clay; and low-cost by-product ammonium sulfate and/or low-cost by-product sulfuric acid and ammonia.

Another principal object of the present invention is to develop new compositions and methods for producing same which are eminently useful for easily, quickly, and accurately producing highly concentrated nitrogen-sulfur suspensions having the following unique and very desirable physical properties and storage and handling characteristics:

(1) Virtually no crystal growth during exceptionally long-storage periods (in excess of 2 years).

(2) Virtually no crystal formation and growth in clear liquid layers during exceptionally long-storage periods.

(3) Very little if any viscosity increase and often viscosity decrease with decrease in temperature over an exceptionally wide range of temperatures.

(4) Can be diluted or mixed with other fertilizer materials in widely varying proportions without damaging quality.

(5) Virtually unaffected by changes in temperature over an exceptionally wide range.

(6) Product ratio and grade can be varied over a wide range without loss of product quality.

(7) Unusually high concentrations of sulfur can be achieved in the products.

A still further object of the present invention is to develop new compositions and methods for easily, quickly, and accurately producing highly concentrated nitrogen-sulfur suspensions characterized as having a rheology such that they can be sprayed directly onto cropland or combined with other fertilizer materials to produce suspension fertilizer blends eminently useful for direct application.

Still a further object of the present invention is to develop new compositions for and methods of easily, quickly, and accurately producing highly concentrated nitrogen-sulfur suspensions by a simple, inexpensive, batch-type or continuous-type process without sacrifice of quality, grade or versatility.

Still further and more general objects and advantages of the present invention will appear from the more detailed description set forth in the following descriptions and examples, it being understood however, that this more detailed description is given by way of illustration and explanation only and not necessarily by way of limitation, since various changes therein will undoubtedly occur to, and therefore may be made by, those skilled in the art without departing from the true scope and spirit of the instant invention.

DESCRIPTION OF THE DRAWING

My invention, together with further objectives and advantages thereof, will be better understood from a consideration of the following description taken in connection with the accompanying drawings and examples in which.

Figure 1:
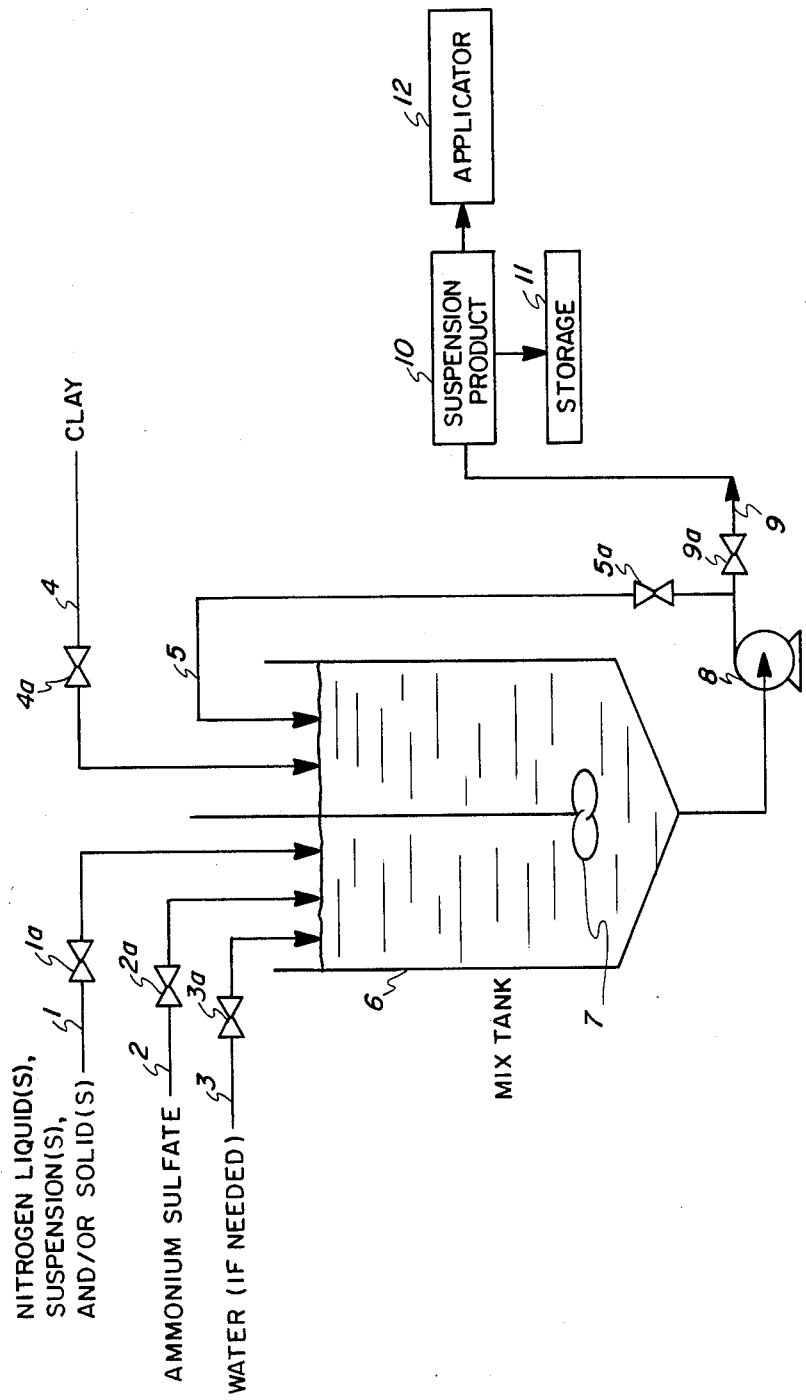
FIG. 1 is a flowsheet generally illustrating the principles of my new and novel process utilizing ammonium sulfate as the sulfur source.

Referring now more specifically to FIG. 1, water if needed for dilution and for providing fluidity to a later mentioned suspension, along with a requisite proportion of nitrogen liquid(s), suspension(s), and/or solid(s) are fed from sources not shown through line 3 and means for control of flow 3a, and line 1 and means for control of flow 1a, respectively, into mix tank 6. As shown, mix tank 6 is equipped with stirrer means 7, which for the sake of convenience is depicted as a common-type propeller or turbine-type agitator mixer mounted on a rotating shaft. After introduction of said water and nitrogen materials into mix tank 6, agitation is started by action of stirrer means 7 and, simultaneously, recirculation is started by means of recirculation pump 8, through line 5 and check valve 5a. Immediately after said agitation and said recirculation is started, suspending clay, from a source not shown is fed through line 4 and means for control of flow 4a into mix tank 6. When addition of said clay is complete, a predetermined amount of ammonium sulfate solids, for formulation, is fed from a source not shown through line 2 and means for control of flow 2a, into mix tank 6. After addition of said ammonium sulfate is complete, said agitation and recirculation is continued for a period of time ranging from about 5 minutes to about 20 minutes and usually about 10 minutes. The resulting final suspension product(s) 10 is subsequently discharged through line 9 and check valve 9a to either storage 11 or to applicator 12, or other types of equipment to be utilized in the application of same to the soil.

Figure 2:
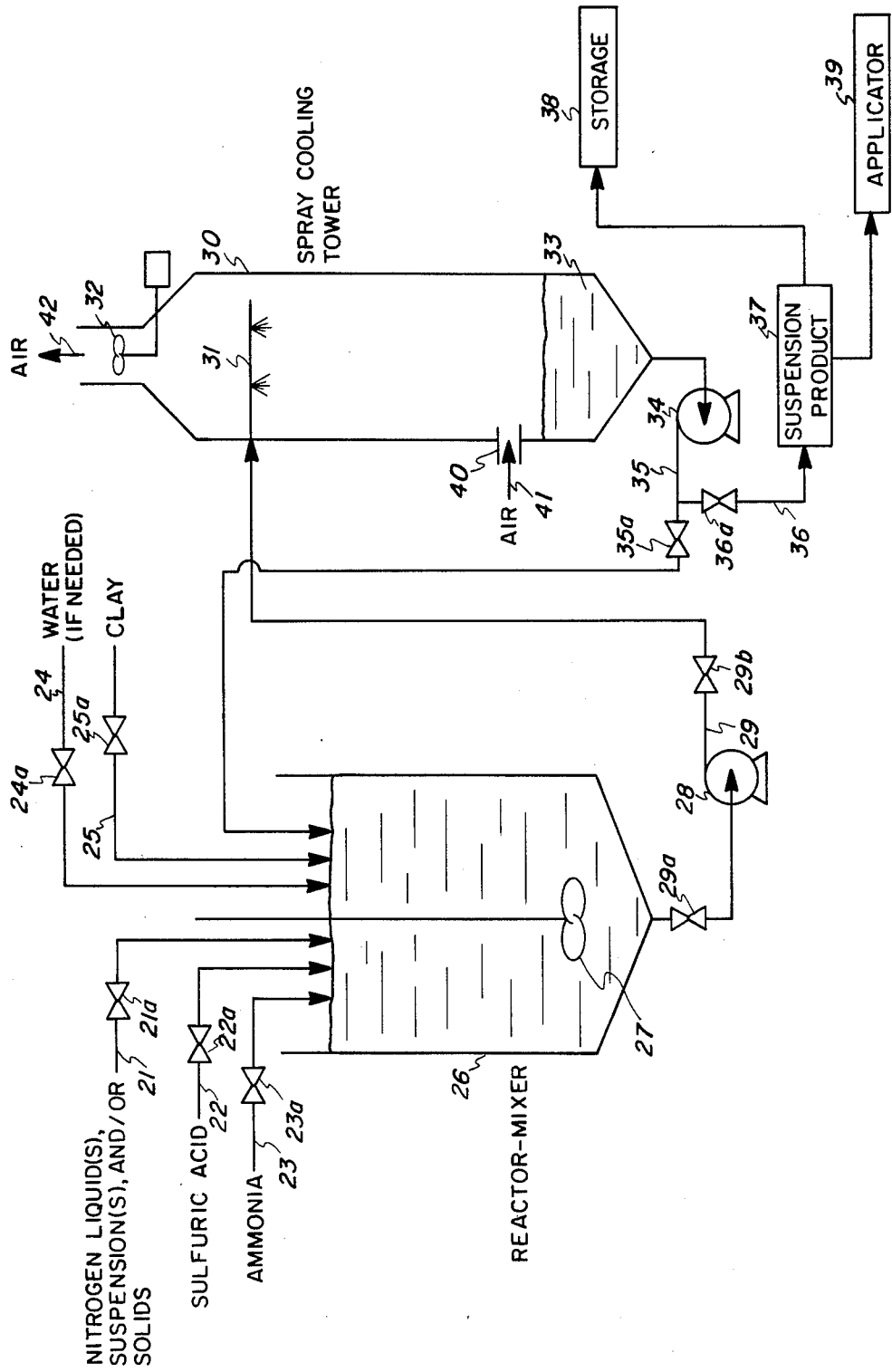
FIG. 2 is a flowsheet generally illustrating the principles of my new and novel process utilizing sulfuric acid, as the sulfur source, and ammonia.

Referring now more specifically to FIG. 2, water, if needed to allow for subsequent evaporation and/or for dilution and for providing fluidity to a later mentioned suspension, along with a requisite proportion of nitrogen liquid(s), suspension(s), and/or solid(s) are fed from sources not shown through line 24 and means for control of flow 24a, and line 21 and means of control of flow 21a, respectively, into reactor-mixer 26. As shown, reactor-mixer 26 is equipped with stirrer means 27, which for the sake of convenience is depicted as a common-type propeller or turbine-type agitator mixer mounted on a rotating shaft. After introduction of said water and nitrogen materials into reactor-mixer tank 26, agitation is started by action of stirrer means 27. Next, a predetermined amount of sulfuric acid, for formulation, is fed from a source not shown through line 22 and means of control of flow 22a, into reactor-mixer 26. Subsequently or simultaneously to the addition of said sulfuric acid, a quantity or rate of ammonia required to attain or maintain, respectively, a near-neutral pH (pH about 7) in the resulting mixture is fed from a source not shown through line 23 and means of control of flow 23a, into reactor-mixer 26. When addition of said ammonia and said sulfuric acid is complete and the mixture is about neutral pH, suspending clay, if needed at this point of the process, is fed from a source not shown through line 25 and means of control of flow 25a, into reactor-mixer 26. After 25 to 50 percent of the clay has been added, the resulting mixture, which may be near boiling, is pumped by pump 28 through line 29 and check valve 29a and means of control of flow 29b into spray nozzles 31 of spray cooling tower 30. Air 41 is pulled into vent 40 of spray tower 30 by fan 32 which pushes air 42 out of the top of tower 30, to effect cooling of the suspension. Cooled suspension 33 is pumped by pump 34 through line 35 and means of control of flow 35a, back into reactor-mixer 26, which is still being agitated. Recirculation of the cooled suspension 33 from tower 30 to reactor-mixer 26 back to tower 30, and so on, is continued until the product has cooled to about 120° F. When the said recirculating product reaches about 120° F., the remaining clay is fed from a source not shown through line 25 and means of control of flow 25a, into reactor-mixer 26. When addition of said remaining clay is complete, recirculation of the cooled suspension 33 from spray tower 30 into reactor-mixer 26 and then back to spray tower 30 is continued for a period of time ranging from about 5 to about 20 minutes and usually about 10 minutes. The resulting final suspension product(s) 37 which was diverted through line 36 and check valve 36a from the recirculation loop between tower 30 and mixer 26 is sent to either storage 38 or to applicator 39, or other types of equipment to be utilized in the application of same to the soil. Of course, it will be appreciated that in still other embodiments of the instant invention, the highly concentrated nitrogen-sulfur suspensions produced according to the first two embodiments supra, can also be produced on a continuous production basis with the equipment described in the first two embodiments, whereby the feed materials are fed simultaneously on a continuous basis.

DESCRIPTION OF THE PREFERRED EMBODIMENTS

In carrying out the objects of the present invention in one form thereof, I have found that highly concentrated nitrogen-sulfur suspension fertilizers with high grade, wide range of ratios, and unique and very desirable physical properties, and storage and handling characteristics can be produced by cold blending ammonium sulfate with various commonly available nitrogen materials or by hot mixing sulfuric acid and ammonia with the various nitrogen materials in proportions such that ammonium sulfate is the sole solid phase present over a very wide range of temperatures.

In practicing the operation of the instant invention, the reaction or mixing vessel is first charged with the water of formulation, if any, and with a nitrogen fertilizer material(s) such as urea, ammonium nitrate, urea solution, ammonium nitrate solution, or urea-ammonium nitrate (UAN) solutions (e.g. 28 or 32% nitrogen) or combinations thereof. Agitation and recirculation are started and the suspending clay is added. When addition of clay is complete, ammonium sulfate (21% nitrogen, 24% sulfur) such as crystalline by-product ammonium sulfate produced from waste of scrubber sulfuric acid, is added and the mixture then is recirculated and agitated for about 10 minutes to gel the clay and produce the finished suspension fertilizer. The period of time for purposes of gelling can range from about 5 minutes to about 20 minutes.

In another embodiment of the instant invention, sulfuric acid and ammonia are used in place of ammonium sulfate, and are added after the water and nitrogen materials have been charged to the reactor. The sulfuric acid can be added first and then the ammonia can be added to bring the mixture up to a near-neutral pH (pH about 7) or the sulfuric acid and ammonia can be added simultaneously at rates required to maintain a near-neutral pH. The latter procedure is more complicated but, because a near-neutral pH is maintained, the reaction mixture would be less corrosive to the reactor and associated equipment. The ammonia and sulfuric acid react to form ammonium sulfate and produce substantial amounts of heat. The ammonium sulfate solids precipitate as the sulfuric acid in the mixture is being ammoniated and the heat resulting from the reaction produces a hot slurry which should be kept agitated and/or recirculated to keep the solids from settling until at least some of the clay has been added and gelled. In producing suspensions with higher sulfur contents, reaction of the ammonia and sulfuric acid results in a boiling slurry, so extra water must be added to the reactor to allow for that which will be evaporated. In products with appreciable ammonium sulfate solids, it may be necessary, depending on the equipment used, to add some of the suspending clay prior to cooling the hot slurry to prevent settling of solids and consequently clogging of pipelines. A small amount of clay will help keep the slurry homogeneous until it has been cooled and the rest of the clay can then be added. If possible, it is best to add as much of the clay as possible after the slurry has been cooled to about 120° F., as subjecting some suspending clays to high temperatures for long periods of time can diminish their suspending qualities and characteristics. A spray cooling tower is used to illustrate cooling of the suspension in the instant invention but various other types of conventional cooling equipment can be used, such as, for example, tank coils, water jacket, or shell and tube heat exchangers.

Quite unexpectedly, I have discovered that by adjusting the compositions of the products to those set forth in the instant description of my new and novel invention, the solubility characteristics of the solid phase, which would normally be considered disadvantageous in the production of suspension fertilizers, have resulted in the products having unique and very desirable physical properties as well as vastly improved storage and handling characteristics, i.e., far superior to suspensions which contain a very soluble solid phase with a very temperature-dependent solubility.

The principal advantage realized by practicing the teachings of the instant invention is that high-analysis nitrogen-sulfur suspensions with the unique and very desirable product properties, supra, can be rapidly produced from low-cost raw materials by a simple, economical, batch-type or continuous-type process. The equipment, which consists of a reactor or mixer equipped with an agitator and/or recirculation pump (and cooling equipment if sulfuric acid and ammonia are used), is simple, economical, and readily available in a multitude of already existing plants. Further aspects of the instant invention will become apparent hereinafter.

The term "suspension fertilizer" as used herein designates a fluid fertilizer generally containing nutrients in solution and in finely divided solid form which are held suspended homogeneously by a gelling-type clay. Other active or inert substances may also be present as by-products or by reason of deliberate addition thereto. The grade X-0-0-Y pertains to a product containing X percent nitrogen, no appreciable amounts of phosphorus or potassium, and Y percent sulfur.

In still another embodiment of the instant invention, I have unexpectedly discovered that in using the procedures and compositions thereof, dry suspending clay can be gelled directly in highly electrolytic nitrogen solutions containing appreciable quantities of the nitrate ($NO_3$) ion. In the practice of prior art methods for gelling suspending clay in such highly electrolytic solutions, the dry clay first had to be dispersed in plain water or other aqueous nonelectrolyte media (such as urea solution) in combination with expensive chemical dispersants. After their preparation, the resulting predispersed fluid clays commonly containing a maximum of only about 25 percent clay were subsequently mixed with the nitrogen solutions containing nitrate or other highly electrolytic materials. It will, of course, be appreciated that the use of such fluid clays in the practice of such prior art caused considerable dilution of the final product. On the other hand, using the compositions and procedures of my new and novel invention, such prior art use of predispersed fluid clays and chemical dispersants is now found to be quite unnecessary, because the ammonium sulfate solids present therein during mixing of the clay apparently result in imparting very substantial amounts of shear energy thereto which in turn is very efficient in effecting gelling of the clay. Apparently, during mixing, the high speed movement and the large surface area of the many ammonium sulfate crystals present in the practice of the instant invention develops a very high level of shear therein sufficient to effectively gel the clay in a relatively short period of time. It will now be appreciated by those skilled in the art that to accomplish such effective gelation of dry clay in the presence of nitrate by strictly mechanical means without solids present therein would require shear rates which are impractical or indeed impossible to attain with conventional large-scale equipment. Accordingly, the gist underlying the concept of this still further embodiment of the instant invention involves a method or technique such as in the instant invention of effectively relying upon the presence of the multiplicity of said ammonium sulfate crystals or, in instances and/or situations wherein a system is being utilized which has no such crystals present, the use of inert solid particles, such as sand or small plastic particles, to gel dry clay directly in highly electrolytic fertilizer solutions. As presently envisioned, such inert solid particles, if used as above described, could be recycled to a gelling chamber or otherwise reused in the process of the instant invention.

EXAMPLES

In order that those skilled in the art may better understand how the present invention may be practiced for the production of high-grade nitrogen-sulfur suspension fertilizers having both good flow characteristics and excellent storage and handling properties, the following examples are given by way of illustration only and not necessarily by way of limitation.

EXAMPLES I-IX

In the pursuit of further information for the purpose of more clearly defining the parameters affecting the practice of the instant invention, the investigations herein reported were made to determine optimum compositions and operations for effecting the production of nitrogen-sulfur suspension fertilizers which are entirely satisfactory for substantially direct application to the soil or for long-term storage and subsequent blending with other fertilizer materials in the production of suspension fertilizer blends.

The procedure for operation of my batch-type equipment for the production of a number of 4-kilogram batches of nitrogen-sulfur suspension fertilizers consisted of first charging the mixer with the formulated quantity of water, if any, and the formulated quantity of either urea, 46 percent N, or urea-ammonium nitrate (UAN) solution containing 32 percent nitrogen and having a urea-to-ammonium nitrate weight ratio of 0.8 (eutectic).

Next, crystalline by-product ammonium sulfate (from coke ovens) was added to the urea or UAN solution while stirring sufficiently to keep solids moving vigorously and then 1 or 2 percent by weight of attapulgite clay was added with continued stirring. After addition of the clay was complete, the products were stirred for 30 minutes at a propeller-tip speed of 30 ft/s to homogenize the resulting mixture, or as in the vernacular of the trade "gel the clay."

The procedures utilized in the series of tests and the results thereof for nine different batches are summarized below in Table I.

TABLE I

| Ex. No. | Nominal grade | Composition, wt % | | | | | Initial crystal size, μm | | Crystal size after 18 mths at 80° F., μm | fp,[1] °F. | Evaluation temp, °F. | Visc, cP | Pourability, Vol. % |
|---|---|---|---|---|---|---|---|---|---|---|---|---|---|
| | | Urea | UAN-32 | (NH$_4$)$_2$SO$_4$ | Water | Clay | at 80° F. | at 32° F. | | | | | |
| I | 18-0-0-18S | 4.9 | 0 | 75.0 | 19.1 | 1.0 | — | — | — | — | 80 | 780 | 100 |
| | | | | | | | | | | | 32 | 860 | 100 |
| | | | | | | | | | | | 20 | 900 | 100 |
| | | | | | | | | | | | 10 | 920 | 100 |
| | | | | | | | | | | | 0 | 980 | 100 |
| II | 17-0-0-17S | 4.6 | 0 | 70.9 | 22.5 | 2.0 | 300 × 700 | 350 × 625 | 275 × 425 | −17 | 80 | 1010 | 100 |
| | | | | | | | | | | | 32 | 1060 | 100 |
| | | | | | | | | | | | 20 | 1050 | 100 |
| | | | | | | | | | | | 10 | 1100 | 100 |
| | | | | | | | | | | | 0 | 1090 | 100 |
| III | 22-0-0-15S | 0 | 27.7 | 62.5 | 8.8 | 1.0 | — | — | — | — | 80 | 1020 | 100 |
| | | | | | | | | | | | 32 | 1030 | 100 |
| | | | | | | | | | | | 20 | 1020 | 100 |
| | | | | | | | | | | | 10 | 1030 | 100 |
| | | | | | | | | | | | 0 | 1170 | 100 |
| IV | 24-0-0-12S | 0 | 42.2 | 50.0 | 5.8 | 2.0 | 200 × 250 | 200 × 300 | 225 × 350 | −24 | 80 | 930 | 100 |
| | | | | | | | | | | | 32 | 810 | 100 |
| | | | | | | | | | | | 20 | 925 | 100 |
| | | | | | | | | | | | 10 | 1380 | 100 |
| | | | | | | | | | | | 0 | 1650 | 100 |
| V | 25-0-0-10S | 0 | 50.8 | 41.7 | 5.5 | 2.0 | 175 × 250 | 250 × 250 | 200 × 325 | −15 | 80 | 530 | 100 |
| | | | | | | | | | | | 32 | 470 | 100 |
| | | | | | | | | | | | 20 | 720 | 100 |
| | | | | | | | | | | | 10 | 1160 | 100 |
| | | | | | | | | | | | 0 | 1530 | 100 |
| VI | 26-0-0-8S | 0 | 59.4 | 33.3 | 5.3 | 2.0 | 140 × 250 | 150 × 250 | 225 × 400 | −13 | 80 | 430 | 100 |
| | | | | | | | | | | | 32 | 370 | 100 |
| | | | | | | | | | | | 20 | 510 | 100 |
| | | | | | | | | | | | 10 | — | 0 |
| VII | 27-0-0-9.5S | 0 | 58.4 | 39.6 | 0 | 2.0 | 500 × 625 | 375 × 500 | 200 × 275 | 7 | 80 | 700 | 100 |
| | | | | | | | | | | | 32 | 1150 | 100 |
| | | | | | | | | | | | 20 | 1400 | 0 |
| VIII | 28-0-0-7.3S | 0 | 67.4 | 30.6 | 0 | 2.0 | 425 × 625 | 375 × 625 | 175 × 300 | 6 | 80 | 500 | 100 |
| | | | | | | | | | | | 32 | 700 | 100 |
| | | | | | | | | | | | 20 | 940 | 0 |
| IX | 29-0-0-5.1S | 0 | 76.6 | 21.4 | 0 | 2.0 | 275 × 350 | 325 × 500 | 175 × 250 | 4 | 80 | 400 | 100 |
| | | | | | | | | | | | 32 | 500 | 100 |
| | | | | | | | | | | | 20 | 500 | 0 |

[1] fp = Freezing point

EXAMPLES X–XIII

For the purposes of the investigations reflected by these examples in the pursuit of still further definition of the parameters referred to in Examples I through IX supra, this portion of my investigation is based on the use of my new and novel method for the batch production of highly concentrated, high-quality nitrogen-sulfur suspensions using small pilot-plant equipment to produce 30-lb batches of product and using larger-scale pilot-plant equipment to produce 5000-lb batches of product. In both pilot plants, the mixing vessel was equipped with both agitator and recirculation pump. The procedure for operation of the pilot-plant equipment consisted of first charging the mixer with the formulated quantity of water and the formulated quantity of either urea, 46 percent N, or UAN solution containing 32 percent N and having a urea-to-ammonium nitrate ratio of 0.8 (eutectic). Next, agitation and recirculation were started and 2 to 3 percent by weight of attapulgite clay was then added to the mixture. When addition of clay was complete, crystalline by-product ammonium sulfate (from coke ovens) was added to the mixture with continued agitation and recirculation. When addition of the ammonium sulfate was complete, the mixture was agitated and recirculated for an additional 5 minutes to gel the clay. Total batch time in these pilot-plant tests was 30 minutes or less.

The procedures utilized in the series of tests and the results thereof for four different batches are summarized below in Table II.

TABLE II

| Example No. | Nominal grade | Composition, wt. % | | | | | Freezing point, °F. | Evaluation temp, °F. | Viscosity, cP | Pourability, vol % | Crystal size, μm |
|---|---|---|---|---|---|---|---|---|---|---|---|
| | | Urea | UAN-32 | (NH$_4$)$_2$SO$_4$ | Water | Clay | | | | | |
| | | 30-lb Batch Tests | | | | | | | | | |
| X | 16-0-0-16S | 4.4 | 0 | 66.7 | 25.9 | 3 | −15 | 80 | 1100 | 100 | 300 × 900 |
| | | | | | | | | 32 | 1280 | 100 | 200 × 775 |
| | | | | | | | | 20 | 1270 | 100 | 225 × 750 |
| | | | | | | | | 0 | 1270 | 100 | 325 × 850 |
| XI | 24-0-0-10S | 0 | 47.7 | 41.7 | 7.6 | 3 | <−15 | 80 | 1240 | 100 | 250 × 900 |
| | | | | | | | | 32 | 1160 | 100 | 300 × 825 |
| | | | | | | | | 20 | 1410 | 100 | 300 × 750 |
| | | | | | | | | 0 | 1420 | 100 | 300 × 800 |
| | | 5000-lb Batch Tests | | | | | | | | | |
| XII | 17-0-0-17S | 4.6 | 0 | 70.9 | 22.5 | 2 | — | 80 | 820 | 100 | — |

TABLE II-continued

| Example No. | Nominal grade | Composition, wt. % | | | | | Freezing point, °F. | Evaluation temp, °F. | Viscosity, cP | Pourability, vol % | Crystal size, μm |
|---|---|---|---|---|---|---|---|---|---|---|---|
| | | Urea | UAN-32 | (NH4)2SO4 | Water | Clay | | | | | |
| | | | | | | | | 32 | 1020 | 100 | — |
| | | | | | | | | 15 | 1060 | 100 | — |
| | | | | | | | | 0 | 1110 | 100 | — |
| XIII | 25-0-0-10S | 0 | 50.8 | 41.7 | 5.0 | 2.5 | — | 80 | 820 | 100 | 250 × 675 |
| | | | | | | | | 32 | 700 | 100 | 250 × 675 |
| | | | | | | | | 15 | 930 | 100 | 250 × 625 |
| | | | | | | | | 5 | 1290 | — | — |
| | | | | | | | | 0 | — | 0 | — |
| | | | | | | | | −2 | 1850 | — | — |

INVENTION PARAMETERS

After sifting and winnowing through the data supra, as well as other results and operations of my new, novel, and improved technique, including methods and means for the effecting thereof, the operating variables, including the acceptable and preferred conditions for carrying out my invention are summarized below:

| Variables | Operating Limits | Preferred Limits | Most Preferred Limits |
|---|---|---|---|
| Mixer Operating Conditions | | | |
| Temperature, °F. | 20–300 | 40–290 | 60–280 |
| Agitator tip speed, ft/s | 10–200 | 15–150 | 20–100 |
| Recirculation pump passes after addition of all feeds | 0–100 | 3–50 | 5–30 |
| Clay residence time, min | 5–30 | 7–25 | 10–20 |
| Mixer Product Composition and Physical Properties | | | |
| Nitrogen, wt % | 14–30 | 15–29 | 16–28 |
| Sulfur, wt % | 3–20 | 4–19 | 5–18 |
| Clay, wt % | 0.5–3.5 | 0.75–3.0 | 1.0–2.5 |
| Ammonium sulfate saturation temperature, °F. | 200–Boiling (varies) | 220–Boiling (varies) | Boiling (varies) |
| Saturation temperature of all other components, °F. | −30 to 40 | −25 to 25 | −20 to 15 |

While I have shown and described particular embodiments of my invention, modifications and variations thereof will occur to those skilled in the art. I wish it to be understood therefore that the appended claims are intended to cover such modifications and variations which are within the true spirit and scope of my invention.

What I claim as new and desire to secure by Letters Patent of the United States is:

1. As a new composition of matter a fertilizer suspension comprising ammonium sulfate, water, a gelling agent; and, as a nitrogen source, materials selected from the groups consisting of urea, ammonium nitrate, and mixtures thereof; said suspension containing a single solid phase at temperatures ranging from about 40° F. up to and including the boiling temperature of said suspension, said solid phase consisting of ammonium sulfate.

2. The composition of claim 1, wherein the nitrogen and the sulfur concentrations range from about 14 percent to about 30 percent and from about 3 percent to about 20 percent by weight, respectively.

3. The composition of claim 1, wherein the nitrogen and the sulfur concentrations range from about 15 percent to about 29 percent and from about 4 percent to about 19 percent, respectively.

4. The composition of claim 1, wherein the nitrogen and the sulfur concentrations range from about 16 percent to about 28 percent and from about 5 percent to about 18 percent, respectively.

5. A batch-type process for producing suspensions containing a single solid phase at temperatures ranging from about 40° F. up to and including the boiling temperature of said suspensions, said solid phase consisting of ammonium sulfate and wherein said process comprises the following steps:

(a) introducing into mixer means predetermined quantities of a nitrogen source selected from the group consisting of solid urea, solid ammonium nitrate, an aqueous solution of urea, an aqueous solution of ammonium nitrate, and mixtures thereof together with any necessary water of formulation;

(b) providing in said mixer means constant agitation and introducing thereinto a predetermined amount of gelling agent, said predetermined amount of said gelling agent ranging from about 0.5 percent to about 3.5 percent by weight based on the weight of later mentioned final product suspension;

(c) providing in said mixer means constant agitation and introducing thereinto a predetermined amount of ammonium sulfate solids and subjecting the resulting mixture therein to substantial agitation for a predetermined period of time; and (d) withdrawing from said mixer means, as the resulting final product, a X-0-0 -Y type, nitrogen-sulfur suspension fertilizer.

6. A continuous-type process for producing suspensions containing a single solid phase at temperatures ranging from about 40° F. up to and including the boiling temperature of said suspensions, said solid phase consisting of ammonium sulfate and wherein said process comprises the following steps:

(a) simultaneously introducing into mixer means predetermined quantities of a nitrogen source selected from the group consisting of solid urea, solid ammonium nitrate, an aqueous solution of urea, an aqueous solution of ammonium nitrate, and mixtures thereof together with any necessary water of formulation;

(b) simultaneously providing in said mixer means constant agitation and introducing thereinto a predetermined amount of gelling agent, said predetermined amount of said gelling agent ranging from about 0.5 percent to 3.5 percent by weight based on the weight of later mentioned final product suspension;

(c) simultaneously providing in said mixer means constant agitation and introducing thereinto a predetermined amount of ammonium sulfate solids and subjecting the resulting mixture therein to substantial agitation for a predetermined period of time; and (d) simultaneously withdrawing from said mixer means as the resulting final product, a X-0-0-Y type, nitrogen-sulfur suspension fertilizer.

7. A batch-type process for producing suspensions containing a single solid phase at temperatures ranging from about 40° F. up to and including the boiling temperature of said suspensions; said solid phase consisting of ammonium sulfate and wherein said process comprises of the following steps:
   (a) introducing into reactor-mixer means predetermined quantities of a nitrogen source selected from the group consisting of solid urea, solid ammonium nitrate, an aqueous solution of urea, an aqueous solution of ammonium nitrate, and mixtures thereof together with any necessary water of formulation;
   (b) providing said reactor-mixer means with constant agitation and introducing into said reactor-mixer means a predetermined quantity of sulfuric acid;
   (c) providing said reactor-mixer means with constant agitation and introducing thereinto a predetermined quantity of ammonia to effect a near-neutral (about pH 7) mixture;
   (d) providing said reactor-mixer means with constant agitation and introducing thereinto a predetermined quantity of gelling agent;
   (e) cooling the resulting material in said reactor-mixer means to less than about 120° F. while providing therein constant agitation; and
   (f) withdrawing from said reactor-mixer means the resulting final product as X-0-0-Y type, nitrogen-sulfur suspension fertilizer.

8. The process of claim 7 wherein said introduction of said sulfuric acid and said ammonia is simultaneous.

9. The process of claim 7 wherein introduced into said reactor-mixer means are additional amounts of said gelling agent after step (e) thereof and subjecting resulting mixture to substantial agitation for a predetermined period of time.

10. The process of claim 8 wherein introduced into said reactor-mixer means are additional amounts of said gelling agent after step (e) thereof and subjecting resulting mixture to substantial agitation for a predetermined period of time.

11. A continuous-type process for producing suspensions containing a single solid phase at temperatures ranging from about 40° F. up to and including the boiling temperature of said suspension said solid phase consisting of ammonium sulfate wherein said process comprises the following steps:
   (a) simultaneously introducing into mixer means predetermined quantities of a nitrogen source selected from the group consisting of solid urea, solid ammonium nitrate, an aqueous solution of urea, an aqueous solution of ammonium nitrate, and mixtures thereof together with any necessary water of formulation;
   (b) simultaneously providing said reactor-mixer means with constant agitation introducing into said reactor-mixer means a predetermined quantity of sulfuric acid;
   (c) simultaneously providing said reactor-mixer means with constant agitation and introducing thereinto a predetermined quantity of ammonia to effect a near-neutral (about pH 7) mixture;
   (d) simultaneously providing said reactor-mixer means with constant agitation and, if needed, introducing thereinto a predetermined quantity of gelling agent;
   (e) simultaneously removing, at least a portion of, the resulting material from said reactor-mixer means to cooling means and therein cooling same to less than about 120° F. and introducing thereinto a predetermined quantity of gelling agent and providing said cooling means with constant agitation; and
   (f) simultaneously withdrawing from said cooling means the resulting final product as X-0-0-Y type, nitrogen-sulfur suspension fertilizer.

* * * * *